Dec. 16, 1930.  W. B. HAMILTON  1,785,682
WINDOW VENTILATOR
Filed Oct. 22, 1928  5 Sheets-Sheet 1
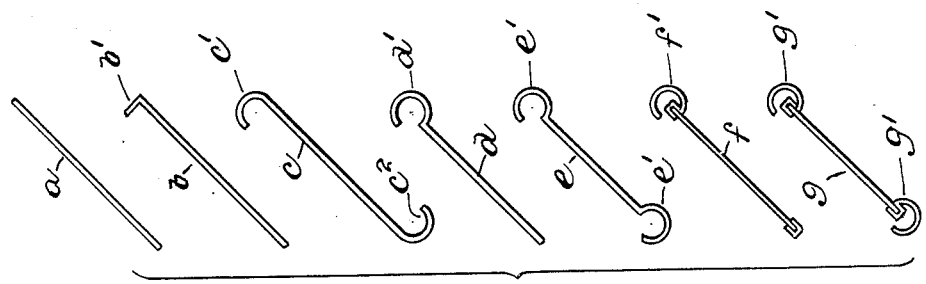
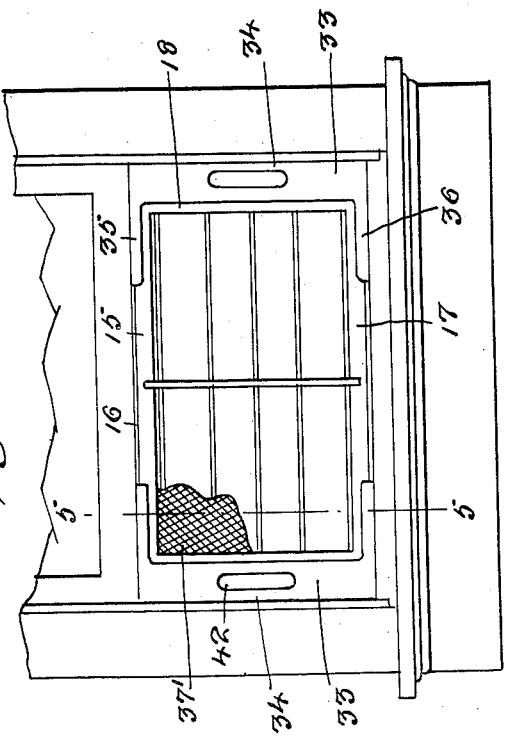
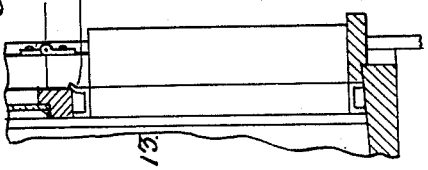
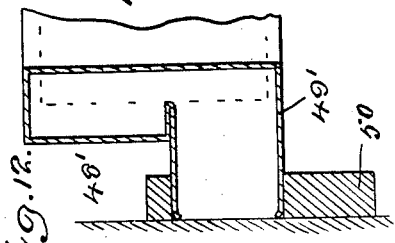
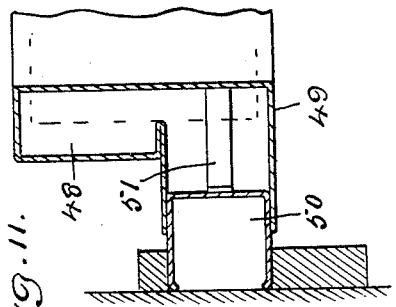
W. B. Hamilton
INVENTOR
BY Victor J. Evans
ATTORNEY

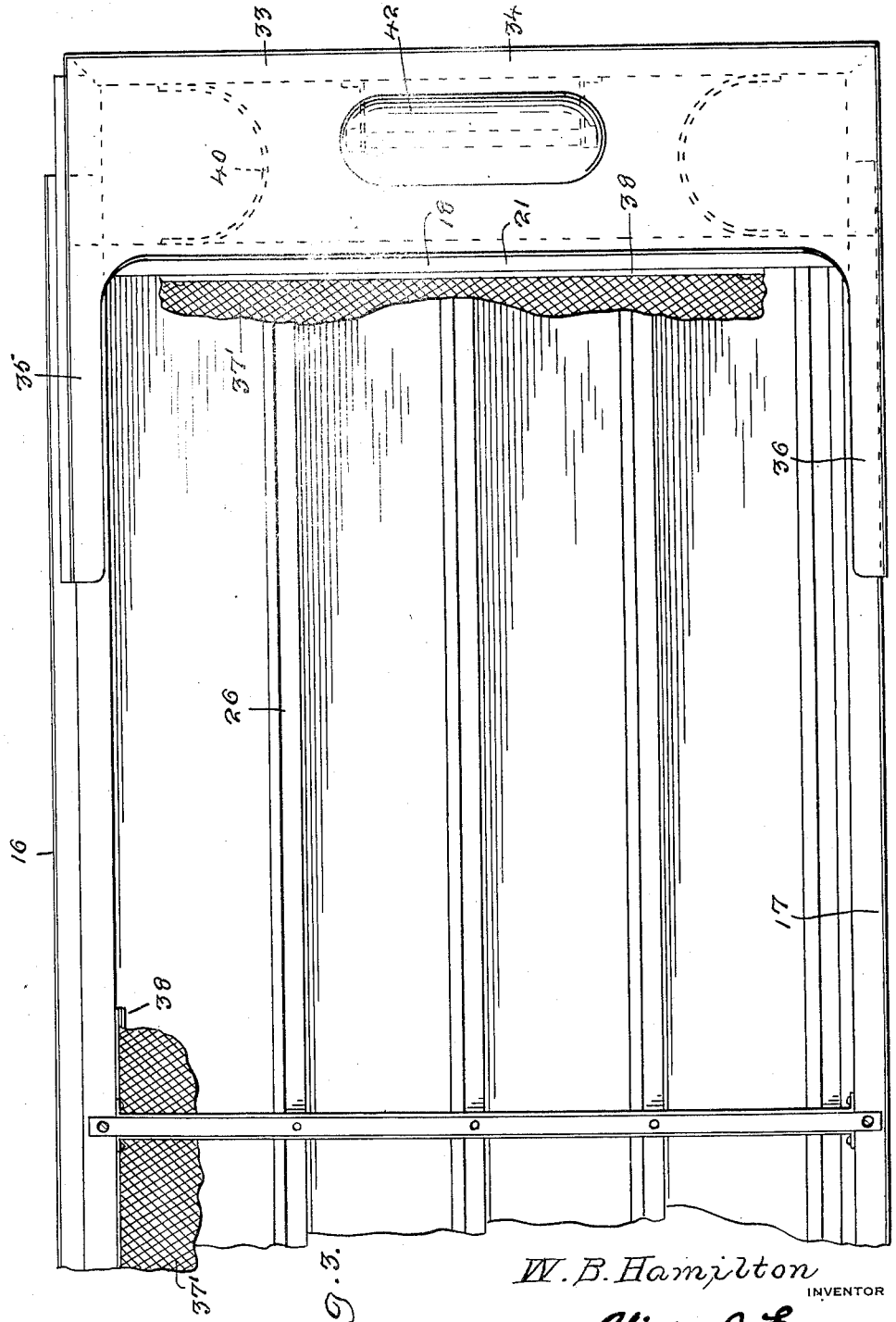

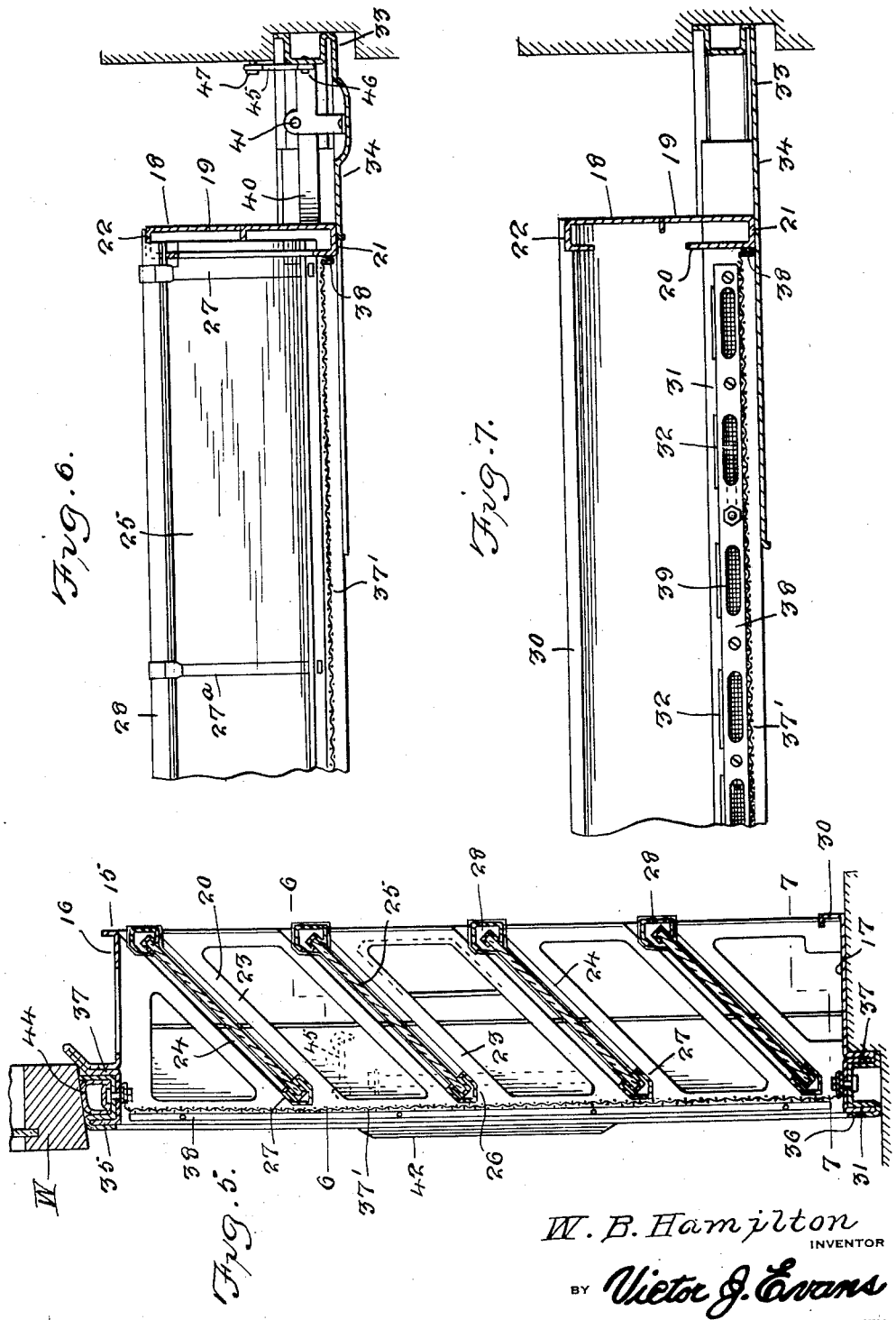

Dec. 16, 1930.  W. B. HAMILTON  1,785,682
WINDOW VENTILATOR
Filed Oct. 22, 1928   5 Sheets-Sheet 4
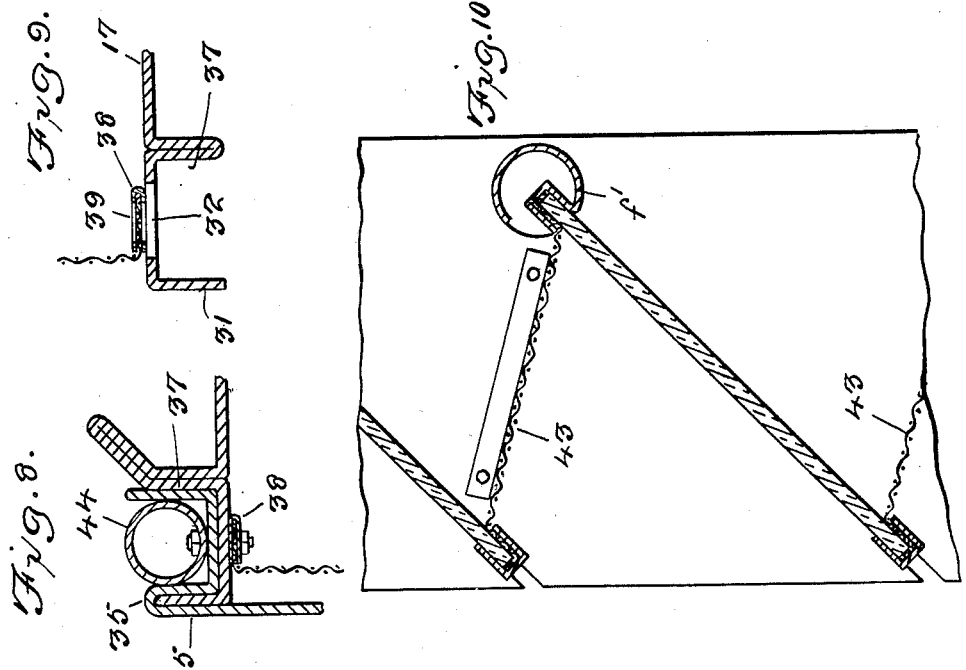
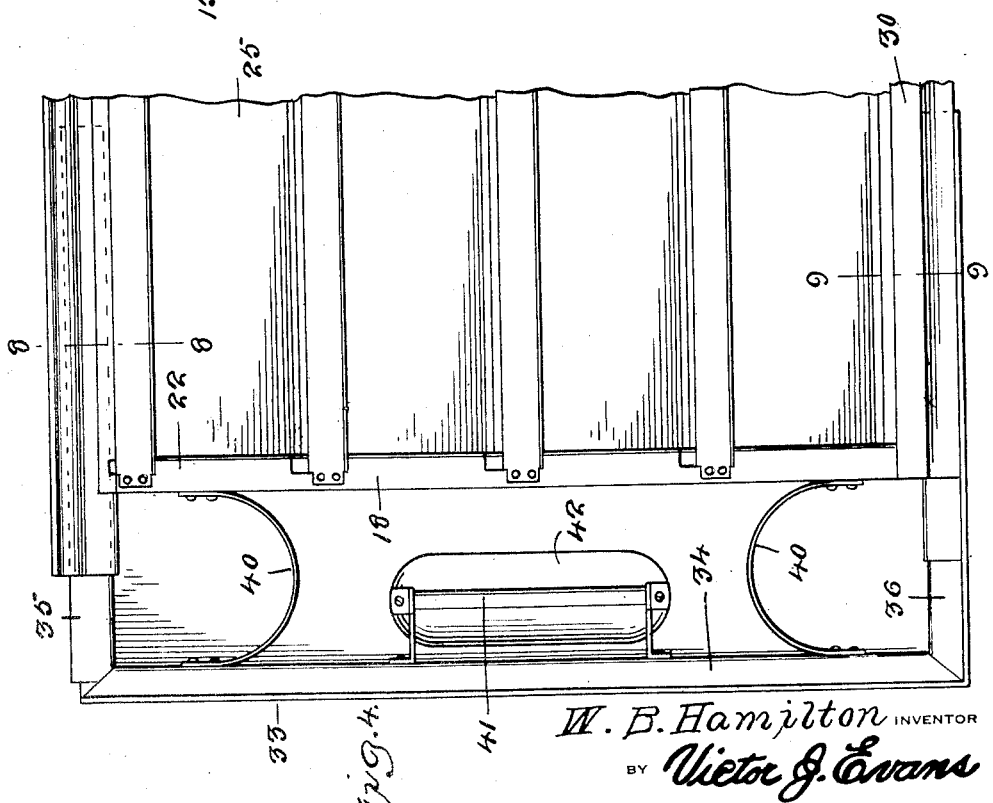
W. B. Hamilton INVENTOR
BY Victor J. Evans
ATTORNEY

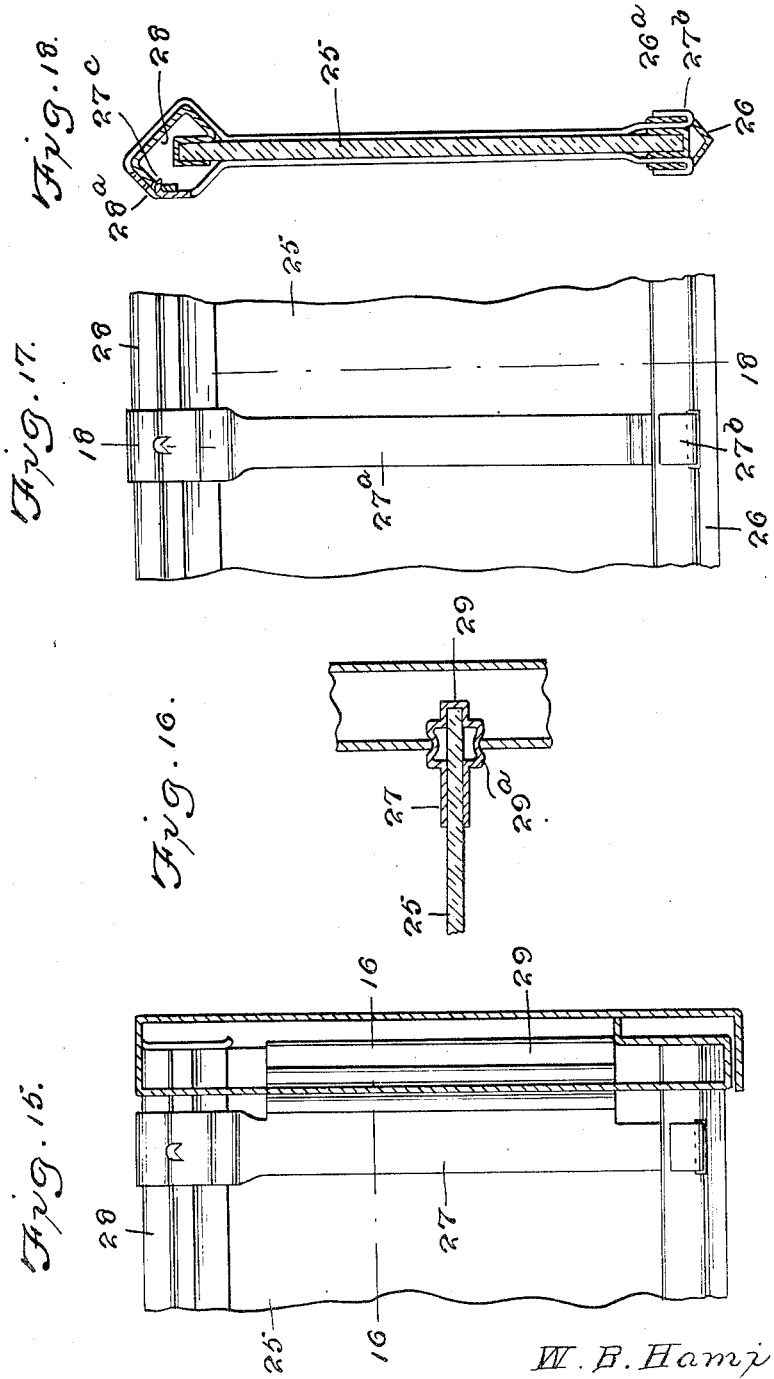

Patented Dec. 16, 1930

1,785,682

UNITED STATES PATENT OFFICE

WILLIAM B. HAMILTON, OF PITTSBURGH, PENNSYLVANIA

WINDOW VENTILATOR

Application filed October 22, 1928. Serial No. 314,272.

This invention relates to ventilators for windows, skylights and other openings, an object being to provide a ventilator of the louvre type in which the louvres may be spaced an appreciable distance apart to admit a maximum amount of air and light, means being provided for preventing the passage of wind driven rain and snow through the ventilator.
Another object of the invention is the provision of means for draining off water and conducting it to the outside of a building, so that water driven into the ventilator will not collect and overflow into the building.
Another object of the invention is the provision of novel means for mounting the louvres within the ventilator frame so that the louvres may be readily removed and replaced, and for adjusting the frame so that the ventilator may be used in openings of different sizes.

With the above and other objects in view, the invention further includes the following novel features and details of construction, to be hereinafter more fully described, illustrated in the accompanying drawings and pointed out in the appended claims.

In the drawings:—

Figure 1 is an elevation showing a fragmentary portion of a window with the invention applied.

Figure 2 is a vertical sectional view with the ventilator in end elevation.

Figure 3 is an enlarged fragmentary front elevation showing one end of the ventilator.

Figure 4 is a similar view looking at the inside of the ventilator.

Figure 5 is an enlarged sectional view taken on the line 5—5 of Figure 1.
Figures 6 and 7 are fragmentary sectional views taken on the lines 6—6 and 7—7 of Figure 5.

Figure 8 is a detail sectional view taken substantially on the line 8—8 of Figure 4.
Figure 9 is a similar view on the line 9—9 of Figure 4.

Figure 10 is a fragmentary vertical sectional view showing a different arrangement of screen.
Figure 11 is a fragmentary horizontal sectional view illustrating a modified form of frame construction.

Figure 12 is a similar view showing another form of frame construction.

Figure 13 is a fragmentary end view illustrating a different way of mounting the ventilator.

Figure 14 shows edge views of several different forms of louvres.

Figure 15 is a fragmentary sectional view showing the means for mounting the louvres in the frame.

Figure 16 is a section on the line 16—16 of Figure 15.

Figure 17 is a fragmentary plan view showing a portion of one of the louvres and illustrating means for holding the louvre rails and baffles in place.

Figure 18 is a section taken substantially on the line 18—18 of Figure 17.

Referring to the drawings in detail wherein like characters of reference denote corresponding parts, the reference character 15 indicates the frame of the ventilator which is preferably formed of sheet metal and includes a top rail 16, a bottom rail 17 and side or end rails 18.

The end rails include an outer wall 19 and an inner skeleton wall 20. This last mentioned wall is spaced from the outer wall and includes front and rear vertically disposed rails 21 and 22 respectively which are connected by upwardly and inwardly inclined bars 23. These bars have longitudinally disposed slots 24 therein for the passage of the opposite ends of louvres 25, so that the latter are also upwardly and inwardly inclined. These louvres may be made of glass, metal, or any composition or combination of materials suitable for the purpose.

The lower outer edges of the louvres are positioned within rails 26 whose opposite ends extend into the openings 24 of the bars 23. The upper inner edges of the louvres are secured within trough-like baffles 28 whose opposite ends extend through said openings. These trough-like baffles are open along their outer faces adjacent the upper inner edges of the louvres as clearly shown in Figure 5 of the drawings, so that rain driven into the ventilator by high winds will enter these trough-like baffles and be conducted to either side of the ventilator frame through the openings 24. The water will then pass downward through the side rails 19 to the bottom of the ventilator.

The rails 26 and baffles 28 may be secured in place by any suitable means. One means for this purpose is illustrated in Figures 15 to 18 of the drawings. This consists in providing end straps 27 and intermediate straps 27a which extend transversely of the louvres. In these figures, the rails 26 are provided with openings 26a for the passage of the ends 27b of the straps 27 and 27a. These ends 27b are then bent over upon the outer faces of the rails 26. The straps 27 and 27a extend around the baffles 28 as shown in Figure 18 and these straps have relatively small tongues 27c struck therefrom which enter openings 28a provided in the baffles 28.

The end straps 27 extend around the ends of the louvres as shown at 29 and are provided with oppositely located grooves 29a which receive the opposed edges of the openings 24 provided in the skeleton wall 20 of the ventilator frame. By reference to Figures 5, 15 and 16 of the drawings it will be seen that the louvres are slidingly mounted within the ventilator frame and may be slid into and out of position for cleaning purposes or for replacing broken or damaged louvres.

The bottom wall 17 of the ventilator frame is provided along its inner edge with an upwardly extending trough-like baffle 30 so as to prevent the passage of rain into a building. The outer edge of the wall 17 is provided with an inverted trough-like portion 31 which extends along the bottom and which is provided with openings 32 for the passage of water into the trough 31. From this trough the water will flow outward at the ends of the frame.

In order to accommodate the ventilator to windows of different widths, the ventilator frame is provided at opposite ends with frame extensions 33. These extensions include vertically disposed side rails 34 from which extend top and bottom rails 35 and 36 respectively. The rails 35 and 36 are transversely channel-shaped and are telescopically received within a trough 37 provided in the top 16 of the frame and in the trough 31 of the bottom 17. The frame extensions 33 may thus be adjusted with respect to the ventilator frame to accommodate the ventilator to windows of different widths.

The outer face of the ventilator is provided with a screen 37' and the latter is held in place by upper and lower clamping strips 38. The lower clamping strip is provided with spaced openings 39 which register with the openings 32 so that water may pass through these openings and drain off as previously described.

The sides 18 of the ventilator frame and the rails 34 of the frame extensions are connected by springs 40 whose opposite ends are secured to the ventilator frame and the ventilator frame extensions. These springs serve to yieldingly resist relative inward movement of the frame extensions and also act to prevent separation of the extensions from the frame.

The extensions are provided with handles 41 and with recesses 42 for the accommodation of the fingers, so that the ventilators may be readily handled.

By reference to Figure 14 it will be seen that louvres of various shapes may be provided and the trough-like baffles may be made integral with the louvres or separately made and attached. At a in Figure 14 a plain louvre is provided, while at b the upper inner edge of the louvre is provided with a baffle flange b'. The louvre c may have its inner upper edge provided with a curved baffle c' and its lower edge with an inwardly curved baffle c2. The baffle d may be provided at its upper inner edge with a substantially circular baffle d' while the louvre e may have similar baffles e' at each end. The louvre f has a substantially circular baffle f' secured to its upper inner edge while the louvre g has similarly shaped baffles g' secured at each edge.

Instead of securing a single piece of screen over the outer face of the ventilator, separate screen sections 43 may be provided between the louvres with the opposite edges of these screen sections secured between the edges of the louvres and the baffles f'.

In order to provide a leakproof joint between the top of the ventilator frame and the bottom rail W of a window, a rubber or other compressible tube 44 is secured within the channel which extends along the top of the ventilator frame. This is clearly shown in Figures 5 and 8 of the drawings.

The ventilator may be held in position by means of hooks 45 which are pivotally secured to the frame extension 33 as shown at 46 and detachably engage studs 47 carried by the window frame.

If desired, the sides of the frame may be formed as indicated at 48 in Figure 11. In this form the sides of the frame are provided with spaced laterally extending flanges 49 which slidingly receive trough-like rails 50, the latter being secured to the ventilator frame by springs 51 which yieldingly resist inward movement.

In Figure 12, the side members 48' are provided with spaced laterally disposed flanges 49' which are received between strips 49a carried by the frame of the window or other opening.

In Figure 13, the inside stop of the sash is constructed to provide a section 51a which is hingedly mounted as at 51b and the ventilator frame is held in place by means of this hinged section. In other words, the hinged section 51a of the stop may be swung inwardly and the ventilator arranged in position and the section restored to its proper position to hold the ventilator in place.

The invention is susceptible of various changes in its form, proportions and minor details of construction and the right is herein reserved to make such changes as properly fall within the scope of the appended claims.

Having described the invention what is claimed is:

1. In a window ventilator, a frame having side walls including an outer wall and an inner skeleton wall communicating with and spaced from the outer wall, said inner skeleton wall including vertically disposed rails and slotted inclined bars connecting the rails, and louvres having their opposite ends extending through the slotted bars.

2. In a window ventilator, a frame having side walls including an outer wall and an inner skeleton wall communicating with and spaced from the outer wall, said inner skeleton wall including vertically disposed rails and slotted inclined bars connecting the rails, louvres having their opposite ends extending through the slotted bars, and trough-like baffles extending along the edges of the louvres and having their opposite ends communicating with the space between the inner and outer walls of the sides of the frame.

3. In a window ventilator, a frame adapted to be secured within a window opening, inwardly and upwardly inclined louvres secured within the frame, protecting rails enclosing the inner and outer edges of the louvres and straps extending transversely of the louvres and engaging the edges of the louvres and the protecting rails to hold the latter in place.

In testimony whereof I affix my signature.

WILLIAM B. HAMILTON.